No. 717,150. Patented Dec. 30, 1902.
C. G. WEMLINGER.
MACHINE FOR BRUSHING SHEET METAL.
(Application filed July 9, 1902.)
(No Model.) 2 Sheets—Sheet 1.
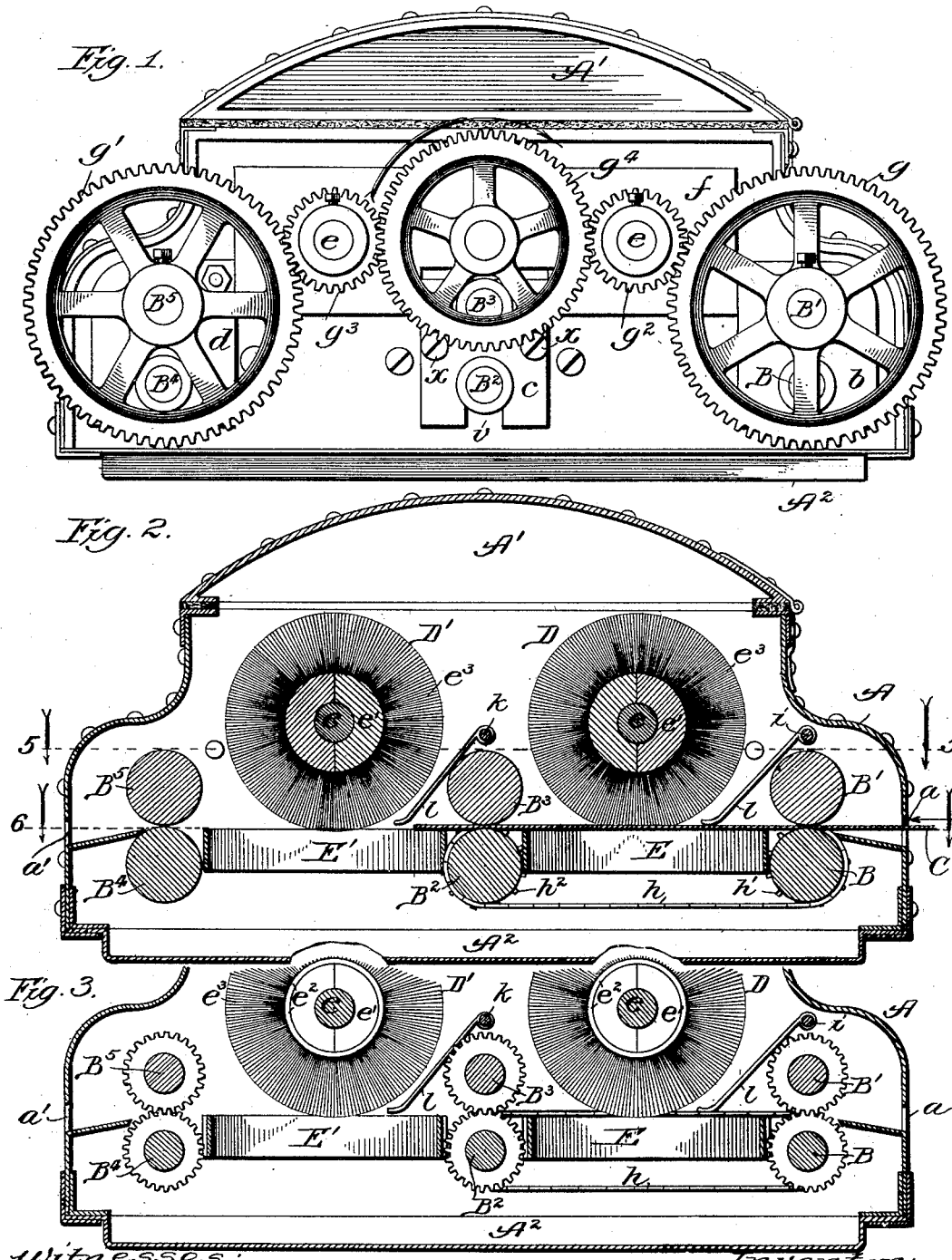

No. 717,150. Patented Dec. 30, 1902.
C. G. WEMLINGER.
MACHINE FOR BRUSHING SHEET METAL.
(Application filed July 9, 1902.)
(No Model.) 2 Sheets—Sheet 2.

Witnesses:
Inventor:
Charles G. Wemlinger,

UNITED STATES PATENT OFFICE.

CHARLES G. WEMLINGER, OF CHICAGO, ILLINOIS.

MACHINE FOR BRUSHING SHEET METAL.

SPECIFICATION forming part of Letters Patent No. 717,150, dated December 30, 1902.

Application filed July 9, 1902. Serial No. 114,866. (No model.)

*To all whom it may concern:*

Be it known that I, CHARLES G. WEMLINGER, a citizen of the United States, residing at Chicago, in the county of Cook and State of Illinois, have invented a new and useful Improvement in Machines for Brushing Sheet Metal, of which the following is a specification.

My invention relates to an improved construction of sheet-metal surface-cleaning machine of the class involving rotary brushes past which the sheet-metal surface to be cleaned is fed to subject it to the cleaning action of the brushes.

The object of my invention is to improve the machine of the class referred to in matters of detail, thereby to improve its operation and to increase its effectiveness.

Figure 4:
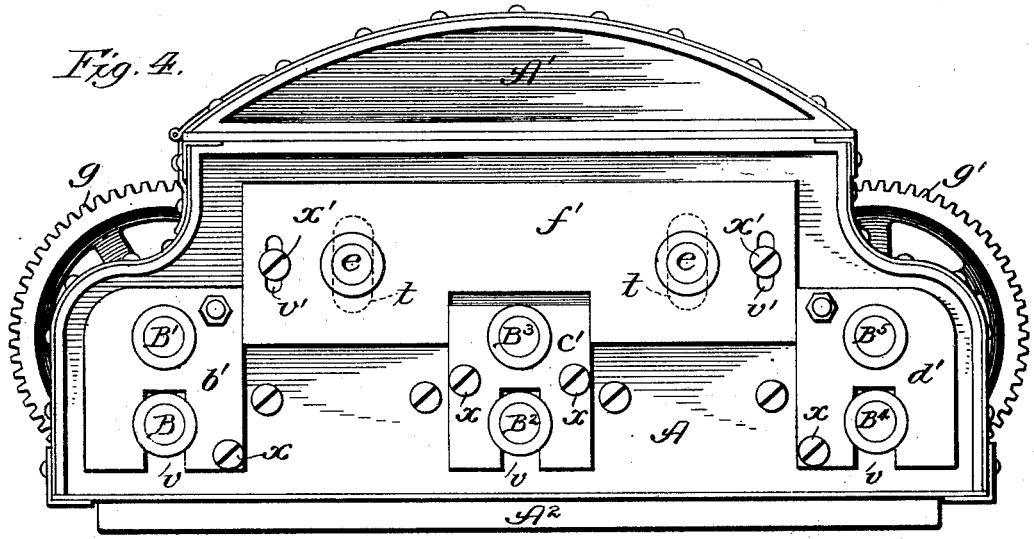
Figure 5:
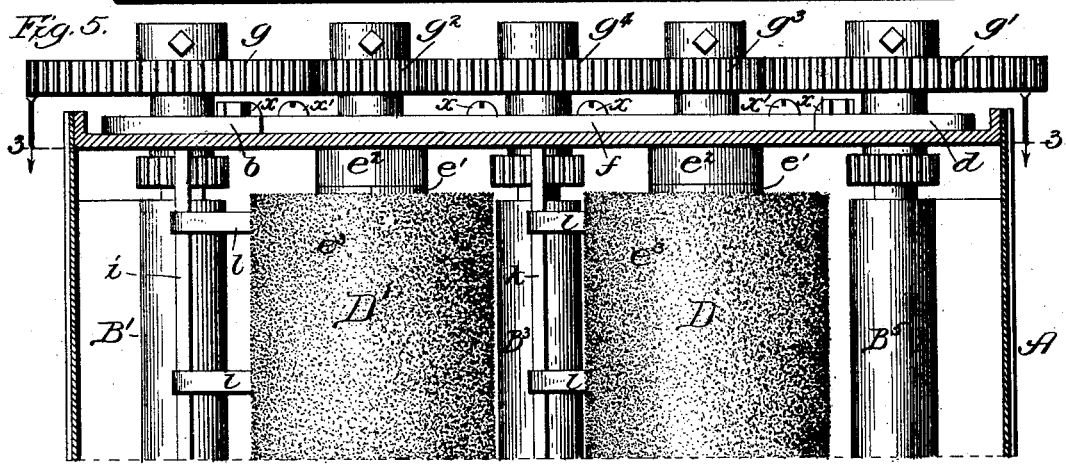
Figure 6:
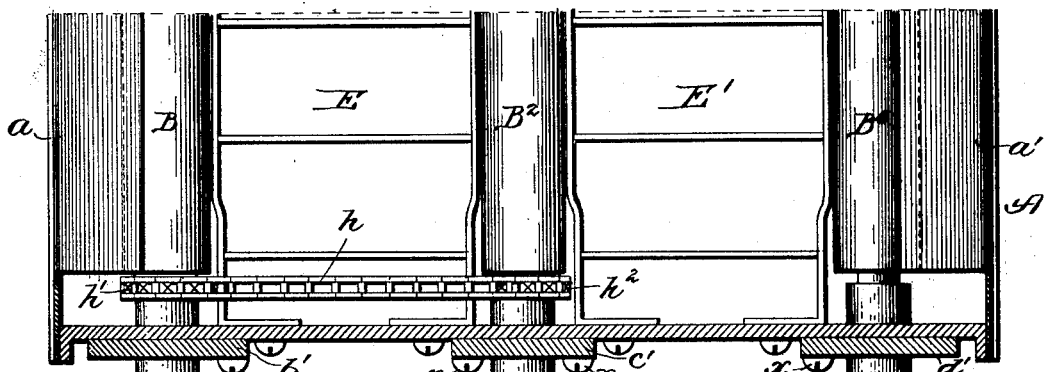

Referring to the accompanying drawings, Figure 1 shows my improved machine by a view in end elevation. Fig. 2 is a view of the same in cross-sectional elevation. Fig. 3 is a section taken at the line 3 3 on Fig. 5 and viewed in the direction of the arrows. Fig. 4 is a view like that shown in Fig. 1, but presenting the opposite end of the machine. Fig. 5 is a section taken at the line 5 5 on Fig. 2 and viewed in the direction of the arrows, but showing the rotary brushes in plan. Fig. 6 is a section taken at the line 6 6 on Fig. 2 and viewed in the direction of the arrows.

A is the frame or casing of the machine, shown as provided on top with a hinged cover A' and on its bottom with a sliding drawer $A^2$, which is movable to open and close it between the sides of the casing. Three pairs of feed-rollers are adjustably journaled in the opposite ends of the casing to extend one pair along one side thereof, another pair along its opposite side, and a third pair midway between the two outer pairs, with the space between the members of each pair in the same horizontal plane, with a feed-slot $a$ in one side of the casing and a discharge-slot $a'$ in its opposite side.

B and B' denote the members of the first pair of feed-rollers, extending adjacent to the feed-slot $a$, $B^2$ and $B^3$ denote the members of the intermediate pair of feed-rollers, and $B^4$ $B^5$ denote the members of the pair of feed-rollers extending adjacent to the discharge-slot $a'$. The journals on the ends of the members of these pairs of rollers project through vertical slots in the opposite ends of the casing, these slots being covered at the outer surfaces of the casing ends by plates $b\ c\ d$ on one end and similar plates $b'\ c'\ d'$ on the opposite end, fastened in place, as by screws $x$. Each of these plates is shown to contain an upper annular opening to receive a journal of an upper feed-roller and a lower slot $v$, in which is confined a journal of a lower feed-roller to adapt it to be raised and lowered with relation to its companion roller for purposes of adjustment, as in case of requirement therefor with reference to different thicknesses of sheet metal C to be fed through the machine.

D and D' are rotary brushes, each comprising a central shaft $e$, having fastened upon it a barrel $e'$, of wood or other suitable material, formed in longitudinal sections, (two sections being shown, which is the preferred construction, though the number of the sections may exceed two,) separably fastened together about the shaft, as by rings $e^2$, applied to the barrels near their ends. In the barrel-sections are secured in any suitable manner the bristles $e^3$. The sectional construction of the brushes facilitates their manufacture and their adjustment in the machine, as well as their removal therefrom when worn out, requiring them to be replaced by new ones. The brushes D and D' extend, respectively, between the planes of the rollers B' $B^3$ and $B^3\ B^5$, and they are journaled at their ends in the ends of the casing, at which their shafts project through vertical slots, like those indicated at $t$ in Fig. 4, covered at the outer surfaces of the respective said ends by plates $f$ and $f'$, in which the brush-shafts are journaled, the plates being fastened through vertical slots $v'$, like those presented in Fig. 4, as by screws $x'$. The described manner of journaling the brushes adapts them to be adjusted in case of wear of the bristles with reference to the plane of feed of the sheet metal to be cleaned by raising and lowering the plates $f\ f'$, as is permitted by the slots therein.

On the ends of the journals of the rollers B' and $B^5$ at one end of the machine are fastened the cog-wheels $g$ and $g'$, and on the corresponding ends of the brush-shafts are fastened, respectively, the pinions $g^2$ and $g^3$, each meshing with the cog-wheel adjacent to it, and between the pinions is journaled to mesh with them on the casing end an idler cogwheel $g^4$. The lower rollers B and B² carry at adjacent ends inside the casing the sprocket-wheels $h'$ and $h^2$, about which passes an endless chain $h$, connecting those feed-rollers together.

From stationary rods $i$ and $k$, extending between the ends of the machine, respectively, over the rollers B' and B³, project at intervals on each and in the direction of the feed of the sheet metal stiff metal fingers $l$ under the rotary brushes to bear against the sheet of metal and prevent it from buckling in its course.

The supporting-bed for the sheet C in passing through the machine is afforded, preferably, by gratings E and E', extending, respectively, between the lower rollers B B² and B² B⁴ and fastened at their extremities to the inner faces of the ends of the casing.

I have more especially devised my improved machine for the purpose of brushing off the one surface to be painted of the commercial article known as "tin-plate" the dust and other dirt which gather upon it while in storage, requiring it to be cleansed thereof to avoid their mixing with and deteriorating the paint.

The operation of the machine is as follows: The sheet C to be cleaned is introduced at one end through the slot $a$ between the rollers B B', which are driven by hand or other power applied in any suitable manner—say to the gear $g^4$—to drive it in the direction indicated by the arrow in Fig. 1. The described gear connections between the feed-rollers produce the rotation of each pair in the direction to feed the sheet through the machine and out of it at the slot $a'$ under the brushes which are rotated contrary to the direction of the feed and at a materially greater speed than that of the feed-rollers by reason of the smaller diameter of the pinions $g^2$ $g^3$ compared with that of the cog-wheels $g$ $g'$. In passing under the rapidly-rotating brushes the surface to be painted of the sheet of tin exposed to them is thoroughly cleansed by their action of the foreign matter upon it, which drops over the rear edge of the sheet as it advances through the open bed E E' into the drawer A². From time to time the drawer may be taken out to empty it of the accumulations of dirt in it.

What I claim as new, and desire to secure by Letters Patent, is—

1. In a machine for brushing sheet metal, the combination with the casing having openings in its opposite sides respectively for the entrance and discharge of the sheet to be brushed, of pairs of feed-rollers journaled in the casing to form between the members of the pairs a passage for said sheet in horizontal line with said openings, brushes journaled in the casing to extend between said rollers above the line of feed, said rollers and brushes being geared together to drive the brushes at a higher rate of speed than the rollers and in contrary direction to the latter, a grating in the casing through which to evacuate the dirt, said grating forming a supporting-bed for said sheet in its passage through the machine, and antibuckling-fingers supported in the casing to extend downward therein toward the path of feed, substantially as described.

2. In a machine for brushing sheet metal, the combination with the casing having openings in its opposite sides respectively for the entrance and discharge of the sheet to be brushed, of pairs of feed-rollers journaled, for the relative adjustment of members of said pairs, in slotted bearing-plates covering slots in the casing ends, said rollers forming between the members of the pairs thereof a passage for said sheet in horizontal line with said openings, brushes journaled, for their adjustment relative to said passage, in slotted plates adjustably secured in said casing ends, said brushes extending between the feed-rollers above the line of feed and said rollers and brushes being geared together to drive the brushes at a higher rate of speed than the rollers and in contrary direction to the latter, and a supporting-bed for said sheet in its passage through the machine, substantially as described.

3. In a machine for brushing sheet metal, the combination with the casing having openings in its opposite sides respectively for the entrance and discharge of the sheet to be brushed, of pairs of feed-rollers journaled in the casing to form between the members of the pairs a passage for said sheet in horizontal line with said openings, brushes comprising bristle-carrying barrels formed in longitudinal sections secured together upon shafts journaled in the casing to extend between said rollers above the line of feed, said rollers and brushes being geared together to drive the brushes at a higher rate of speed than the rollers and in contrary direction to the latter, and an open supporting-bed in the casing for said sheet and through which to evacuate the casing of dirt, substantially as described.

CHARLES G. WEMLINGER.

In presence of—
ALBERT S. BACCI,
M. S. MACKENZIE.